United States Patent [19]

Songer et al.

[11] Patent Number: 4,748,051

[45] Date of Patent: May 31, 1988

[54] REDUCING EXPOSURE TO HAZARDOUS PARTICLES

[75] Inventors: Paul E. Songer, Rossville, Ga.; Warren D. Stidham, Hixson, Tenn.

[73] Assignee: Polysar Financial Services S.A., Fribourg, Switzerland

[21] Appl. No.: 889,258

[22] Filed: Jul. 25, 1986

Related U.S. Application Data

[63] Continuation-in-part of Ser. No. 718,371, Apr. 1, 1985, abandoned.

[51] Int. Cl.$^4$ .............................................. B05D 7/00
[52] U.S. Cl. .................................. 427/212; 427/213; 427/214; 427/215; 427/221
[58] Field of Search ............... 427/221, 393.6, 212, 427/213, 214, 215

[56] References Cited

U.S. PATENT DOCUMENTS

| | | | |
|---|---|---|---|
| 4,089,999 | 5/1978 | Mondt et al. | 427/393.6 X |
| 4,119,560 | 10/1978 | Sheeline | 427/221 X |
| 4,212,755 | 7/1980 | Ruff et al. | 427/221 X |
| 4,233,362 | 11/1980 | Novak et al. | 427/393.6 X |
| 4,234,632 | 11/1980 | Lubowitz | 427/221 X |
| 4,293,596 | 10/1981 | Furendal et al. | 427/393.6 X |
| 4,315,959 | 2/1982 | Brandts Buys et al. | 427/214 |
| 4,369,203 | 1/1983 | Hansen | 427/393.6 X |
| 4,380,595 | 4/1983 | Arpin | 524/5 |
| 4,477,490 | 10/1984 | Weisberg | 427/393.6 X |
| 4,594,268 | 6/1986 | Kirwin | 427/212 X |
| 4,632,847 | 12/1986 | Lomansney et al. | 427/154 |

*Primary Examiner*—Thurman K. Page
*Attorney, Agent, or Firm*—Stevens, Davis, Miller & Mosher

[57] ABSTRACT

Atmospheric contamination by residual hazardous particles remaining on a substrate following removal from the substrate of a layer of material containing such particles is substantially reduced by coating the substrate with certain aqueous coating compositions which produce tacky films on drying. For example, the health hazard from airborne asbestos fibers remaining attached to a substrate from which a layer of asbestos-containing material has been removed is substantially reduced by coating the substrate with an aqueous latex composition containing certain carboxylated butadiene styrene polymers.

11 Claims, No Drawings

REDUCING EXPOSURE TO HAZARDOUS PARTICLES

The present patent application is a continuation in part of U.S. patent application Ser. No. 718,371 filed Apr. 1, 1985 and now abandoned.

The present invention is concerned with reducing the environmental contamination by hazardous particles remaining on a substrate from which a layer of material containing such particles has been removed by coating the substrate with a tacky composition. In a preferred embodiment, the invention relates to preventing the release of the residue of asbestos fibers which remain attached to a substrate from which bulk asbestos-containing material has been removed, by coating the substrate with an aqueous latex containing carboxylated butadiene styrene polymers.

In a further embodiment the present invention seeks to reduce the airborne concentration of particulate hazardous material in an environment. This may be in an environment where the hazardous material is being removed in bulk form such as asbestos or where the hazardous material arises from the storage or processing of relatively inert material, such as coal dust, grain dust or flour.

BACKGROUND OF THE INVENTION

Within the last few years there has been increasing concern with the importance of environmental factors in health. Particulate material of many types is suspected of being a health hazard such as fine dusts or powder including silica dust (both amorphous and crystalline), silicates (including graphite mica, perlite and talc containing asbestos fibers), coal dust, grain dust, flour, asbestos, mineral wool fiber, cotton dust, wood dust, glass fibers, inorganic lead dust, and zinc oxide dust. Of particular concern is the presence of airborne asbestos fibers in buildings in whose construction asbestos-containing materials were used because the inhalation of such fibers is believed to present a serious health hazard.

For many years asbestos-containing compositions have been widely used in building construction for various purposes such as to retard fire, for thermal and acoustical insulation, and for decorative coatings. In particular, they have been used in buildings having high population density such as schools, office buildings, hospitals, hotels, libraries, churches and high rise apartments. Asbestos is normally used in admixture with various materials such as mineral or rock wool or fiberglass for insulation, and with wood pulp, paper, plaster of Paris, vermiculite, perlite or clay for purposes such as decorative finishes. The compositions are usually applied to steel, concrete or perlited gypsum plaster, the latter being commonly referred to as brown coat. Application is usually by spraying but in some cases by trowelling or brushing.

Over a period of time, the material deteriorates or becomes damaged and releases asbestos fibers into the atmosphere during normal operation and maintenance of the building, such as by rubbing and even by circulation of the air adjacent to the surface. It is known that asbestos fibers may persist in the environment almost indefinitely and therefore present a continuous source of exposure. Many are extremely minute and remain suspended in the air for a very long time, and those which settle can readily become airborne again by slight movement of air.

Attempts have been made to overcome the problem and prevent the escape of fibers into the environment by spraying the surface of the asbestos-containing layer with materials which coat and penetrate the surface to protect the surface against damage by impact. Materials available for this purpose include water-based latex polymers and epoxy resins. For example, U.S. Pat. No. 4,380,595, issued Apr. 19, 1983, to Arpin discloses the use of a two part composition comprising an aqueous silicate solution and an acrylic polymer dispersion. However, the coating of asbestos-containing material in this way does not eliminate the concern with environmental damage because the surface is still subject to damage even though the escape of asbestos fibers may be reduced or postponed.

Therefore, it is becoming increasingly common practice to remove asbestos-containing material, particularly from public buildings. Removal is time consuming and expensive and complete removal is difficult if not impossible to achieve. One procedure which is followed is to seal with plastic sheeting the area from which asbestos is to be removed so that the workmen, equipped with respiration equipment, work in effect within a plastic bag. Ventilation is provided by admitting air to the enclosed area through one conduit and evacuating air through a second conduit which is fitted with a filter to remove airborne particles.

The normal procedure is to moisten the asbestos-containing material by spraying with water and to remove it from the substrate which may be concrete, steel or brown coat by scraping with a suitable tool such as a putty knife. The layer being removed usually has a thickness of about ⅛ to ¼ inches, although it may be thicker. The substrate is then washed to remove loose particles remaining on the surface and circulation of air through the enclosed area is continued for a period of time, for example 48 hours, in an effort to remove all airborne particles in the atmosphere.

The procedure removes the bulk of the asbestos-containing material from the substrate but a fine film containing asbestos remains on the surface. This represents a continuing hazard since asbestos fibers can escape gradually over a long period of time. In some cases, an attempt is made to remove the residual material by brushing the surface such as with wire brushes. However, this procedure itself creates a hazardous situation since asbestos fibers released during the process are extremely small in length and diameter and can remain suspended in the air indefinitely.

SUMMARY OF THE INVENTION

It has been discovered that when the surface or substrate carrying such particles is coated with an aqueous composition comprising a polymer which dries to form a continuous tacky surface, the particles are encapsulated and bound to the surface, and are less readily redispersed into the atmosphere by vigorous rubbing or brushing. In addition, airborne particles settling on the coating adhere to it, thus preventing them from redispersing in the atmosphere by air circulation.

The present invention therefore provides a process for reducing the health hazard from residual hazardous particulate material following the bulk removal of said material from a substrate which comprises treating the substrate and optionally adjacent surfaces with a coating composition consisting essentially of: an emulsion, solution, dispersion or liquid polymer of one of more synthetic or natural polymers having a Tg less than 10° C. or synthetic or natural resins selected from the group consisting of:

(i) co-or homo-polymers of one or more $C_{4-6}$ conjugated diolefins which may be unsubstituted or substituted by a $C_{1-4}$ alkyl radical or a chlorine;

(ii) copolymers comprising from about 0.5 up to about 40 weight percent of a $C_{2-4}$ olefin and from about 60 to about 99.5 weight percent of one or more esters selected from the group consisting of $C_{1-8}$ alkyl or alkanol esters of $C_{3-6}$ ethylenically unsaturated carboxylic acids and $C_{2-8}$ alkenyl or alkenol esters of $C_{1-8}$ saturated acids;

(iii) random or block copolymers comprising from about 85 to about 40 weight percent of one or more $C_{4-6}$ conjugated diolefins and from about 15 to 60 weight percent of one or more $C_{8-12}$ vinyl aromatic monomers which may contain a nitrogen atom in the aromatic ring, and which may be unsubstituted or substituted by a $C_{1-4}$ alkyl radical or a chlorine or bromine atom, and (iv) polymers comprising from about 5 to 20 weight percent of vinyl pyridine; from about 5 to 20 weight percent styrene and the balance butadiene;

(v) co- or homo-polymers of one or more monomers selected from the group consisting of $C_{2-8}$ alkenyl or hydroxy alkenyl esters of $C_{1-8}$ saturated carboxylic acids;

(vi) copolymers comprising from about 0.5 to 25 weight percent of a $C_{1-8}$ alkyl or alkanol ester of a $C_{3-6}$ ethylenically unsaturated carboxylic acid and from about 99.5 to about 75 weight percent of a $C_{2-8}$ alkenyl or alkenol ester of a $C_{1-8}$ saturated acid;

(vii) natural rubber latex;

(viii) rosin, $C_{1-8}$ alkyl; $C_{1-8}$ hydroxyalkyl, and mono, di, or tri ethylene glycol esters of rosin and hydrogenated rosin wherein the $C_{1-8}$ hydroxyl alkyl esters may contain up to four hydroxyl groups, and polyterpenes;

(ix) synthetic hydrocarbon tackifier resins manufactured from a cut of a $C_9$ aromatic hydrocarbon stream; or a cut of a $C_5$ aliphatic or cycloaliphatic hydrocarbon stream;

(x) co- or homo-polymers of from 100 to 90 weight percent of a $C_4$ straight chained or branched aliphatic monomer containing a single ethylenic unsaturated bond and from 0 to 10 weight percent of a $C_{4-6}$ conjugated diolefin; which polymer may contain up to about 5 weight percent of a halogen atom selected from the group consisting of chlorine and bromine atoms;

(xi) co- or homo-polymers of $C_{2-8}$ alkenyl or hydroxy alkenyl ethers of $C_{1-6}$ saturated aliphatic alcohols;

(xii) polyvinyl pyrrolidone; and (xiii) natural gums where required an effective amount of one or more members selected from the group consisting of surfactants, thickeners, fillers, plasticizers, and extending oils; and said composition being film forming and applied in an amount sufficient to substantially coat said substrate and having sufficient tack to cause said particlate hazardous material to adhere to or be adsorbed onto said substrate. Generally the composition should have on drying a tack of at least 300 g when determined by the Polyken Probe Tack Test according to D-2979 on a sample having a thickness of 0.003 inches, and be applied in an amount sufficient to provide at least about 0.1 oz. per square foot of said polymer.

It is an object to provide a coating having a tacky surface in order that any particles, such as asbestos fibers, settling on it from the atmosphere adhere The present invention also provides a process for reducing the airborne concentration of particulate hazardous material in an environment comprising providing a removable surface, not less than about one-sixth the surface of the interior of said environment, said surface having been coated with a composition consisting essentially of one or more natural or synthetic polymers having a Tg less than 10° C. or natural or synthetic resins selected from the group consisting of:

(i) co- or homo-polymers of one or more $C_{4-6}$ conjugated diolefins which may be unsubstituted or substituted by a $C_{1-4}$ alkyl radical or a chlorine atom;

(ii) copolymers comprising from about 0.5 up to about 40 weight percent of a $C_{2-4}$ olefin and from about 60 to about 99.5 weight percent of one or more esters selected from the group consisting of $C_{1-8}$ alkyl or alkanol esters of $C_{3-6}$ ethylenically unsaturated carboxylic acids and $C_{2-8}$ alkenyl or alkenol esters of $C_{1-8}$ saturated acids;

(iii) random or block copolymers comprising from about 85 to about 40 weight percent of one or more $C_{4-6}$ conjugated diolefins and from about 15 to 60 weight percent of one or more $C_{8-12}$ vinyl aromatic monomers which may contain a nitrogen atom in the aromatic ring, and which may be unsubstituted or substituted by a $C_{1-4}$ alkyl radical or a chlorine or bromine atom; and (iv) polymers comprising from about 5 to 20 weight percent of vinyl pyridine; from about 5 to 20 weight percent styrene and the balance butadiene, (v) co- or homo-polymers of one or more monomers selected from the group consisting of $C_{2-8}$ alkenyl or hydroxy alkenyl esters of $C_{1-8}$ saturated carboxylic acids;

(vi) copolymers comprising from about 0.5 to 25 weight percent of a $C_{1-8}$ alkyl or alkanol ester of a $C_{3-6}$ ethylenically unsaturated carboxylic acid and from about 99.5 to about 75 weight percent of a $C_{2-8}$ alkenyl or alkenol ester of a $C_{1-8}$ saturated acid;

(vii) natural rubber latex, (viii) polymers comprising at least about 60 weight percent of a $C_{1-8}$ alkyl or alkanol ester of a $C_{3-4}$ ethylenically unsaturated carboxylic acid, (ix) rosin, $C_{1-8}$ alkyl; $C_{1-8}$ hydroxyalkyl, and mono, di, or tri ethylene glycol esters of rosin and hydrogenated rosin wherein the $C_{1-8}$ hydroxyl alkyl esters may contain up to four hydroxyl groups, and polyterpenes;

(x) synthetic hydrocarbon tackifier resins manufactured from a cut of a $C_9$ aromatic hydrocarbon stream; or a cut of a $C_5$ aliphatic or cycloaliphatic hydrocarbon stream;

(xi) co- or homo-polymers of from 100 to 90 weight percent of a $C_4$ straight chained or branched aliphatic monomer contains a single ethylenic unsaturated bond and from 0 to 10 weight percent of a $C_{4-6}$ conjugated diolefin, which polymer may contain up to about 5 weight percent of a halogen atom selected from the group consisting of chlorine and bromine atoms;

(xii) co- or homo-polymers of $C_{2-8}$ alkenyl or hydroxy alkenyl ethers of $C_{1-6}$ saturated aliphatic alcohols; and (xiii) polyvinyl pyrrolidone;

(xiv) natural gums where required an effective amount of one or more members selected from the group consisting of thickeners, fillers, plasticizers and extending oils;

said composition being film forming and having on drying a tack sufficient to adhere or adsorb said airborne particulate hazardous material to said surface. Generally the dried composition should have a tack of at least 300 g when determined by the Polyken Probe Tack Test according to ASTM D-2979 on a sample having a thickness of 0.003 inches, and being applied in an amount sufficient to provide at least about 0.1 oz. per square foot of said polymer In one embodiment of the invention the atmosphere in said environment is circulated over said surface at a rate so that the volume of atmosphere in said environment will pass over said surface not less than once per hour.

The present invention also provides in the physical removal from a substrate by scraping or brushing of a hazardous material which is prone to release airborne particles the improvement comprising impregnating the material with a composition consisting essentially of:

an emulsion, solution, dispersion, or liquid polymer of one or more natural or synthetic polymers having a Tg less than 10° C. or natural or synthetic resins selected from the group consisting of:

(i) co- or homo-polymers of one or more $C_{4-6}$ conjugated diolefins which may be unsubstituted or substituted by a $C_{1-4}$ alkyl radical or a chlorine atom;

(ii) copolymers comprising from about 0.5 up to about 40 weight percent of a $C_{2-4}$ olefin and from about 60 to about 99.5 weight percent of one or more esters selected from the group consisting of $C_{1-8}$ alkyl or alkanol esters of $C_{3-6}$ ethylenically unsaturated carboxylic acids and $C_{2-8}$ alkenyl or alkenol esters of $C_{1-8}$ saturated acids;

(iii) random or block copolymers comprising from about 85 to about 40 weight percent of one or more $C_{4-6}$ conjugated diolefins and from about 15 to 60 weight percent of one or more $C_{8-12}$ vinyl aromatic monomers which may contain a nitrogen atom in the aromatic ring, and which may be unsubstituted or substituted by a $C_{1-4}$ alkyl radical or a chlorine or bromine atom; and (iv) polymers comprising from about 5 to 20 weight percent of vinyl pyridine; from about 5 to 20 weight percent styrene and the balance butadiene;

(v) co- or homo-polymers of one or more monomers selected from the group consisting of $C_{2-8}$ alkenyl or hydroxy alkenyl esters of $C_{1-8}$ saturated acids;

(vi) copolymers comprising from ahout 0.5 to 25 weight percent of a $C_{1-8}$ alkyl or alkanol ester of a $C_{3-6}$ ethylenically unsaturated carboxylic acid and from about 99.5 to about 75 weight percent of a $C_{2-8}$ alkenyl or alkenol ester of a $C_{1-8}$ saturated carboxylic acid;

(vii) natural rubber latex;

(viii) rosin, $C_{1-8}$ alkyl; $C_{1-8}$ hydroxyalkyl, and mono, di, or tri ethylene glycol esters of rosin and hydrogenated rosin wherein the $C_{1-8}$ hydroxyl alkyl esters may contain up to four hydroxyl groups, and polyterpenes;

(ix) synthetic hydrocarbon tackifier resins manufactured from a cut of a $C_9$ aromatic hydrocarbon stream; or a cut of a $C_5$ aliphatic or cycloaliphatic hydrocarbon stream;

(x) co- or homo-polymers of from 100 to 90 weight percent of a $C_4$ straight chained or branched aliphatic monomer contains a single ethylenic unsaturated bond and from 0 to 10 weight percent of a $C_{4-6}$ conjugated diolefin, which polymer may contain up to about 5 weight percent of a halogen atom selected from the group consisting of chlorine and bromine atoms;

(xi) co- or homo-polymers of $C_{2-8}$ alkenyl or hydroxy alkenyl ethers of $C_{1-6}$ saturated alipnatic alcohols; and (xii) polyvinyl pyrrolidone., (xiii)natural gum where required an effective amount of one or more members selected from the group consisting of surfactants, thickeners, fillers, plasticizers and extending oils; said composition having on drying a tack of at least 300 g when determined by the Polyken Probe Tack Test according to ASTM D-2979 on a sample having a thickness of 0.003 inches.

DETAILED DESCRIPTION OF THE INVENTION

The polymer latexes which may be used in the invention are available commercially or naturally occuring latex or which can be readily prepared by well known polymerization procedures. The polymers should generally have a glass transition temperature (Tg) below about 10° C. and preferably from about −5° C. to −40° C. The glass transition temperature is described in "Principles of Polymer Chemistry"—Flory, pp. 56–57, Cornell University Press.

A second characteristic of the composition is to provide sufficient tack to prevent the re-release of settled particulate hazardous material to the atmosphere. Generally the coating compositions of the present invention should provide a tack of at least about 300, preferably about 450 g, more preferably from at least 650 g to 1000 g when determined by the Polyken Probe Tack Test according to ASTM D-2979 on a sample having a thickness of 0.003 inches.

This tack may be achieved by the use of tackifiers or by using a polymer having a broad molecular weight range or a molecular weight range with a bi- or polyodal distribution. The molecular weight distribution is obtained by the employment of a molecular weight regulator or modifier in the emulsion polymerization procedure as is well known to those skilled in the art of emulsion polymerization. It may also be obtained by blending latexes of polymers having low molecular weights with latexes of polymers having high molecular weights.

Examples of suitable polymers are polymers which may be prepared in the form of a latex by emulsion polymerization techniques or polymers which may be prepared in the absence of water, then subsequently dispersed in water. Preferably, the polymer is prepared as a latex by emulsion polymerization techniques. The techniques for polymerizing such latices are well known to those skilled in the art.

Some of the polymers useful in accordance with the present invention may be prepared as an aqueous emulsion or dispersion. Other polymers are not so readily prepared in an aqueous system and should be prepared as solution polymers or as suspensions and dispersions in an organic phase.

Methods for making aqueous emulsions and dispersions from such systems are well known in the art. U.S. Pat. No. 4,486,562 issued Dec. 4, 1984, assigned to Polysar Limited broadly discusses a suitable procedure to convert a polymer cement to an aqueous dispersion, the disclosure of which is hereby incorporated by reference.

For most applications it is preferred that the compositions used in accordance with the present invention are in the form of aqueous based emulsions, dispersions or solutions. Latices of the polymers useful in accordance with the present invention are commercially available over a wide range of polymer or resin solids from about 25 to 75 weight percent. Some of the material useful in accordance with the inventions are a liquid per se. These materials may be used directly or diluted to obtain a suitable viscosity for application. While water is the preferred diluent or solvent there may be situations where the diluent or solvent may be an organic liquid or a mixture of water and an organic material.

There are many classes of polymers which may be used in accordance with the present invention. Natural or synthetic rubbery polymers, natural and synthetic resins, and natural gums and tacky liquids are useful. These include the following types of polymers or resins.

Co- or homo-polymers of $C_{4-8}$ conjugated diolefins which may be unsubstituted or substituted by a chlorine or bromine atom. Such polymers include natural rubber, polybutadiene and chloroprene.

Random or block co-polymers of from about 85 to 40 weight percent of a $C_{4-8}$ conjugated diolefin and from about 15 to 40 weight percent of one or more vinyl aromatic monomers. The vinyl aromatic compound may contain from about 8 to 12 carbon atoms and may include a heteroatom in the aromatic ring such as oxygen, sulfur, or nitrogen, preferably nitrogen. Such vinyl aromatic monomers may be unsubstituted or substituted by a $C_{1-4}$ alkyl group or a chlorine or bromine atom. Suitable vinyl aromatic monomers include styrene, alpha-methyl styrene, alpha-chlorostyrene, alpha-bromostyrene, and vinyl pyridine. The latex may be a latex of a copolymer of from about 30 to 70 weight percent of styrene and 70 to 30 weight percent butadiene. Such latices may contain from about 25 to 75 weight percent of polymer. If vinyl pyridine is used as a comonomer, it is typically used with another vinyl aromatic monomer. Typically, such polymers comprise from about 5 to 20 percent vinyl pyridine with an approximate equivalent amount of a vinyl aromatic monomer which does not contain a heteroatom, such as styrene, and the balance a conjugated diolefin. Optionally such polymers may further contain one or more functional monomers usually in amounts from about 0.05 weight percent to not greater than about 15 weight percent, preferably not more than about 5 percent in total. Representatives of such functional monomers are $C_{3-9}$ ethylenically unsaturated acids and $C_{1-8}$ alkyl and alkanol esters thereof, amides of such acids which may be substituted at the nitrogen atom by up to two $C_{1-8}$ alkyl or alkanol radicals and $C_{3-9}$ ethylenically unsaturated aldehydes.

In some embodiments of the present invention the polymers may be acrylates. Typically, such polymers comprise at least about 60 weight percent of a $C_{1-8}$ alkyl or alkanol ester of acrylic or methacrylic acid. The esters may contain functional monomers, as described above, preferably acids or amides. Such functional monomers may optionally be present in amounts up to about 40 weight percent.

The polymer may be a copolymer of a $C_{2-4}$ olefin and one or more esters selected from the group consisting of esters of a $C_{3-6}$ ethylenically unsaturated acid and a $C_{1-8}$ alkyl or alkanol radical, or an ester of a $C_{1-6}$ saturated acid and a radical derived from $C_{3-8}$ ethylenically unsaturated alcohol. Representative of the esters of unsaturated acids are lower alkyl and alkanol esters of acrylic, methacrylic and fumaric acid. Typical of the esters of $C_{1-6}$ saturated acids and $C_{2-8}$ ethylenically unsaturated alkenols are vinyl acetate. Typical olefins are ethylene and propylene. Generally, the olefin is present in amounts from about 0.5 up to 40 weight percent, preferably up to about 25 weight percent and the balance is the ester. Such polymers may also contain the above described functional monomers, preferably $C_{3-6}$ ethylenically unsaturated acids in amounts up to about 15 weight percent, preferably up to about 5 weight percent.

The polymer may be a co- or homo- polymer of one or more vinyl esters. The vinyl esters are $C_{2-8}$ alkenyl or alkenol esters of $C_{1-6}$ saturated acids. Suitable vinyl esters have been discussed above. Optionally the vinyl ester may contain up to about 15, preferably less than 5, weight percent of one or more of the functional monomers discussed above.

The polymer may be a copolymer of a vinyl ester and a saturated ester of an unsaturated carboxylic acid. Typically such polymer contains up to about 25 percent of a saturated ester of an unsaturated acid and the balance a vinyl ester of a saturated carboxylic acid. The preferred esters of unsaturated carboxylic acids are esters of acrylic and methacrylic acid. Suitable vinyl esters and esters of an unsaturated carboxylic acid have been discussed above. Optionally the above polymers may contain up to about 15, preferably less than about 5, weight percent of one or more of the functional monomers discussed above, other than the ester monomers.

The resin may be a naturally occurring resin such as rosin or as $C_{1-8}$ alkyl, hydroxyalkyl, or ethylene glycol esters of rosin or hydrogenated rosin. The hydroxyalkyl esters may contain up to about 4 hydroxyl groups. Suitable resins include polymerized rosin, hydrogenated rosin, and glycerine, pentaerythritol and mono, di and tri-ethylene glycol esters of rosin and hydrogenated rosin. Preferably these resins have a softening point, as determined by the ring and ball method of from about 75° C. to about 100° C. Suitable resins are sold under the trade names Staybelite Ester 10; Pentalyn H., Staybelite Ester 3, and Hercolyn D, sold by Hercules Inc. The suitable resins also include polyterpenes which are polymers of alpha and beta pinene.

The resin may be a synthetic tackifier resin manufactured from a cut of a $C_9$ aromatic hydrocarbon stream or a cut of a $C_5$ aliphatic or cycloaliphatic hydrocarbon stream. Preferably these resins will have a softening point as determined by the ring and ball method from about 10° C. to about 85° C. Suitable resins are sold under the trade names Piccovar, Hercotac, Picconal and Piccolyte by Hercules Inc.

The polymer may be a co- or homo-polymer from 100 to about 96 weight percent of a $C_4$ straight chained or branched aliphatic monomer containing a single ethylenically unsaturated bond and from 0 to 10 weight percent of a $C_{4-6}$ conjugated diolefin. The polymer may contain up to about 5 percent of a halogen selected from the group consisting of chlorine and bromine. Suitable polymers include polybutylene, and polyisobutylene and their halogenated homologues.

The polymer may be a homopolymer of a $C_{2-8}$ hydroxy alkenyl ether of a $C_{1-6}$, preferably a $C_{1-4}$ saturated alphatic alchohol. Suitable polymers include polyvinyl methyl ethers. The polymer may be a homo polymer of vinylpyrrolidone, such as polyvinyl pyrrolidone.

The composition may comprise a natural gum. One class of these materials comprises polysaccarides such as gum arabic, guar gum, etc. The term also includes animal gums such as fish gum, etc.

In one preferred embodiment of the invention the compound is based on a latex of random copolymer of a conjugated diolefin, a vinyl aromatic monomer, and an ethylenically unsaturated carboxylic acid, and optionally a small amount of an additional monomer. The copolymer contains a relatively high proportion of conjugated diolefin which contributes to the tack and adhesive properties of the coating. Any $C_{4-6}$ aliphatic conjugated diolefin may be used with the preferred ones being 1,3-butadiene and isoprene.

It is present in an amount from about 50 to 85 percent by weight and preferably from about 60 to about 75 percent by weight of the polymer. The vinyl aromatic monomer may be selected from any such polymerizable monomer. The preferred ones are styrene or styrene containing substitution by a $C_{1-4}$ alkyl radical or a chlorine or bromine atom such as alpha-methyl styrene or chlorostyrene. The vinyl aromatic monomer is present in an amount from about 10 to about 50 percent by weight and preferably from about 20 to about 40 percent by weight of the polymer.

The ethylenically unsaturated carboxylic acids may be either mono- or di- carboxylic acids. The preferred acids contain from 3 to 6 carbon atoms and include maleic, fumaric, acrylic, methacrylic, butenoic and itaconic acid. They may be present in an amount from about 0.5 to 10 percent by weight, and preferably from about 1 to about 5 percent by weight of the polymer.

In addition to the diolefin, the vinyl aromatic monomer and the carboxylic acid, the polymers may contain up to about 5 percent by weight of an amide of a $C_{3-9}$ ethylenically unsaturated acid, an ethylenically unsaturated aldehyde, an anhydride of an ethylenically unsaturated dicarboxylic acid or mixtures of two or more of these.

The amide may be unsubstituted or substituted at the nitrogen atom by a $C_{1-8}$ alkyl or alkanol radical. Suitable amides include acrylamide, methacrylamide, alpha-isopropylacrylamide, cinnamamide and the amides of unsaturated acids such as butenoic acid, pentenoic acid, nexanoic acid, heptenoic acid and octenoic acid. The lower amides are more readily available such as acrylamide, methacrylamide and $C_{1-4}$ lower alkyl and alkanol derivatives thereof such as N-methylol acrylamide. The aldehyde may be any one having 3 to 9 carbon atoms in which the double bond is in the carbon backbone, such as acrolein, methacrolein, butenaldehyde, pentenaldehyde, etc., or it may be a cyclic aldehyde such as cinnamaldehyde. The anhydride may be an anhydride of a $C_{4-8}$ ethylenically unsaturated dicarboxylic acid such as maleic anhydride or phthalic anhydride.

Conventional high conversion hot emulsion polymerization techniques may be used in the production of the random carboxylated butadiene styrene latex. An aqueous emulsion of monomers is polymerized at a temperature generally from about 70° C. to about 90° C. over a period of up to about 10 hours.

The emulsion is prepared using conventional surfactants and the electrolyte used in the polymerization recipe may be any appropriate electrolyte, for example pyrophosphates. The polymerization catalyst may be any such catalyst known in the art of emulsion polymerization.

For block copolymers of $C_{8-12}$ of vinyl aromatic monomer and a $C_{4-6}$ conjugated diolefin the block of the vinyl aromatic monomer may have a molecular weight from about 2,000 to 100,000 and a Tg of about at least 25° C. and the block of the $C_{4-6}$ conjugated diolefin has a molecular weight from about 25,000 to 1,000,000 and a Tg of less than 10° C. Suitable polymers are described in U.S. Pat. No. 3,880,953 issued Apr. 29, 1975 assigned to The Goodyear Tire and Rubber Company. The disclosure of which is hereby incorporated by reference.

Conventional techniques may be used to modify the molecular weight distribution to enhance the tack of the coating. This may involve the use of known modifiers or chain transfer agents such as those disclosed in U.S. Pat. Nos. 4,013,824 and 4,064,337, issued Mar. 22, 1977, and Dec. 20, 1977, respectively, to Phillips Petroleum. The range of molecular weights may be obtained by a suitable selection of the type and amount of modifier or by blending latexes of polymers of widely varying molecular weights.

In the random carboxylated butadiene styrene polymers, a preferred molecular weight distribution is such that from about 20 to about 75 percent by weight, and preferably from about 35 percent by weight to about 55 percent by weight, has a molecular weight greater than about 320,000. In a preferred embodiment, the polymer has a molecular weight distribution so that from about 20 to about 45 percent by weight of the polymer has a weight average molecular weight from about 3,500 to about 32,000. The molecular weight distribution for the polymer may be determined by mixing the latex with a water compatible solvent for the polymer such as tetrahydrofuran. The insoluble polymer or gel will not dissolve in the solvent. A portion of the solvent and dissolved polymer is then passed through a gel permeation chromatograph column (GPC) to separate the polymer into fractions by molecular weight. The sum of the insoluble or gel content as a percent of the total polymer in the latex plus the percent of polymer with a molecular weight greater than 320,000, as determined by GPC, will give the total percent of polymer having a molecular weight greater than 320,000. The molecular weight distribution curve of the polymer when plotted as MW/D log (M) against log M may be broad or it may exhibit two peaks indicating a polymer of polydisperse molecular weight distribution.

The solids content of the latexes which may be used in the practice of the invention is desirably from about 35 and 65 percent by weight and for best results from about 40 to 60 percent by weight. Although it is not essential in the practice of the present invention, adhesion to the substrate may be improved in some cases by post polymerization addition of up to about 10 percent of a surfactant, and preferably about 5 percent. Depending on the compound composition the surfactant may be used in amounts of less than about 2 percent. The surfactant may be anionic, nonionic or a mixture of anionic and nonionic surfactants. Commercially available surfactants are listed in "McCutcheon's Emulsifiers and Detergents" published annually.

There may be added to the latex to improve the viscosity and flow characteristics thereof up to about 10 percent by weight based on the total solids of a conventional thickening agent. Suitable thickening agents include polyvinyl alcohol, and water-soluble cellulose ethers, such as methyl cellulose, carboxymethyl cellulose and the like. However, such addition is not essential in the practice of the present invention.

If desired, other materials can be added to the latex. These include materials which are frequently added to latexes such as organic or inorganic fillers. Examples of such fillers are titanium dioxide, zinc oxide, fused silica, calcium carbonate and clays including kaolin and bentonite.

In the case where the coating is a mixture of a polymer and a tackifier resin the amount of tackifier is not critical provided that its presence does not result in too low a tack value. In the case of tackifying resins, they may be used in amounts which range generally up to about 200 parts by dry weight by weight per hundred parts of polymer in the latex. For random copolymers of vinyl aromatic monomers and conjugated diolefins which may optionally contain functional monomers, and tackifying resin the dry weight ratio of component may range from 100:10 to 100:200 preferably 100:10 to 100:150 most preferably 100:20–100:40.

Those skilled in the art can readily determine the level of filler or tackifying resin which may be usefully used in accordance with the present invention.

In accordance with the present invention the bulk particulate hazardous material may be impregnated with the composition of the present invention prior to removal by scraping or brushing. The bulk material is preferably impregnated to about a quarter to half an inch from its surface and the impregnated layer scraped off. This provides two advantages. It reduces the initial release of airborne particulate materials and minimizes the residue of water left after the removal of the asbestos. In conventional process relatively large amounts of water containing the particulate material are generated during the bulk removal. This water must be stored, transported and treated as a hazardous material.

The amount of coating composition used in the practice of the invention to coat surfaces other than the bulk hazardous material is preferably sufficient to provide a coating weight of polymer of at least about 0.1, preferably at least about 0.2 oz. per square foot. An economic upper limit is about 0.4 oz. per square foot. Small amounts, for example as low as 0.1 oz. per square foot, will significantly reduce the escape of fibers from the surface of the substrate and larger amounts, for example, 0.6 oz. per square foot can be used witnout detrimental effects.

The coating composition is preferably applied by spraying. It is desirable to avoid the use of a high level of air since this could dislodge particles from the surface being coated into the atmosphere. Therefore, it is preferable to use an airless spray gun. However, an air gun can be used provided it is operated at a low pressure, for example less than about 30 psi. Although a single application of the coating composition may suffice to provide a suitable coating, it may be desirable to apply additional applications.

The present invention may also be used to lower the content of airborne particulate hazardous material during the removal of such material from an environment which has been enclosed or sealed. Airborne particulate hazardous material is released when the bulk hazardous material is subject to mechanical forces such as scraping or brushing. These are standard techniques used to free asbestos from substrates. The particulate material may also be stirred up by drafts created within the environment.

The compounds in accordance with the present invention are tacky. This helps the surfaces coated with such compounds to bind particulate hazardous material, including asbestos to a surface. In the previously discussed aspect of the invention this property was used to encapsulate and adhere particulate hazardous material to surfaces of the substrate which had been coated with such hazardous materials or adjacent surfaces. In a further aspect of the present invention this property is used to adhere airborne particulate material to a surface introduced into the area where the airborne concentration of such particulate material is high.

In the removal of particulate hazardous materials from an environment the area is first sealed. Usually this involves sealing windows and other areas of egress to the exterior. Often plastic sheet material, such as polyethylene or polypropylene is used to help seal doors and the like. Such sheet material may be coated with compounds of the present invention to adhere airborne particles.

The contractor may hang appropriate uncoated sheet material then apply a coating using the aqueous based compositions described above. The contractor may also use a solvent based system using the above described compositions; however this is much less desirable as the solvent presents a fire hazard and in some cases a health hazard.

Suitably coated sheet material could be manufactured using conventional coating equipment and aqueous based, solvent based or hot melt adhesive compositions in accordance with the present invention.

Generally, to reduce the time required to significantly lower the amount of particulate hazardous material in the air, a surface at least about one-sixth, more preferably at least about one-third, the size of the interior surface of the area being worked on should be coated in accordance with the present invention.

The surface area introduced into the working area will generally depend upon the tack of the coating and the time in which it is desired to reduce the airborne concentration of particulate material. The surface coated with the compound may be equal to or exceed the surface of the boundary of the area from which the hazardous material is being removed. The expansion of surface area is very simple. Sheet material may be placed within the environment with a large exposed surface area. The sheet material may be any suitable material including poly alpha-olefins such as polypropylene and polyethylene, a polyethylene terphlalate resin such as Mylar (trade mark), paper, polyamide, and polyester. The sheet material may be extruded, non woven or woven.

To provide a large surface area the sheet may be used to cover areas where the bulk hazardous material is not present, such as walls. If a larger surface area is desired the sheet material may be suspended within the area in which the bulk hazardous material is being removed. This may be from the ceiling or by the use of frames.

Such surfaces are helpful to remove airborne particulate hazardous material from the area. Their passive use relies on the random contact of the airborne particles with the surface.

The efficiency of the process can be significantly increased by subjecting the atmosphere within the area to circulation to increase the contact between the airborne particles and the sheet material. Generally, a significant decrease in the concentration of airborne particulate material or the time it takes to significantly reduce such concentration will occur at a rate of circulating the entire atmosphere, within the area being treated, of at least about once per hour; although higher circulation rates may be used. A rate of circulating the atmosphere in the environment of not less than about 5 times per hour is desirable, however care should be taken so that the circulation rate of the air is not too high to reduce the ability of the coated sheet to adhere the airborne particles. Useful air velocities are at least about 300 ft/min. more preferably at least about 500 ft/min. at distances up to about 15 feet from the air circulation means.

The sheet material may form a baffle or a tube through which the atmosphere is passed. The sheet material may be merely suspended with a means to circulate the atmosphere directed at or on the sheet. Means to circulate the atmosphere are well known and include conventional fans, and other means for moving gases.

When the sheet material is loaded with the particulate hazardous material it may be taken down, rolled up and disposed of. This provides for a relatively simple means for disposing of material.

In some instances it may be desirable to use the sheet material in association with a support which permits the unwinding of the sheet from an unwind stand, coating of the sheet adjacent the unwind stand, and winding the sheet at a windup stand distant from the coating means. The rate of travel may be discontinuous or continuous, for highly contaminated environments.

If operated continuously the rate of travel should be slow so that the surface is reasonably loaded with particulate material prior to being rolled up. The coating means may be any suitable means such as a bath or a brush or sponge supplied from a reservoir. One advantage of this particular system is that the rolled up sheet material is relatively easy to handle for disposal purposes.

The present aspect of this invention is useful not only with airborne particulate materials which are hazardous from a medical or toxicological view point but is also useful in reducing the airborne concentration of "inert" particulates such as coal dust, flour, grain dust, and other finely subdivided material which may present a hazard if ignited.

Without wishing to limit the scope of the disclosure, the following examples illustrate the broader aspects of the invention.

EXAMPLE 1

The latex used in this example was a latex of carboxylated butadiene styrene polymer containing about 25 percent by weight styrene and about 72 percent by weight butadiene. About 25 percent of the polymer had a weight average molecular weignt between 3,500 and 32,000 and about 70 percent by weight above an average molecular weight of 320,000. A dried sample of the latex had a tack of about 650 g determined using the Polyken Probe Tack Test according to ASTM-D2979 using a tester supplied by Testing Machine Inc. and a sample having a thickness of 0.003 inches.

Three rectangular concrete blocks having a surface of about 20 square inches were cast from a cement aggregate in a wooden mold with a depth of about 1.75 inches.

A paste was prepared by dispersing chrysolite in methyl alcohol. Tne surface of each block was then coated with a layer of the paste using a trowel, care being taken to ensure that, as far as possible, the same coverage was applied to each block. The alcohol was allowed to evaporate leaving a thin film of asbestos. The asbestos film on the surface of two blocks was then coated with the latex using an airless Wagner Spray Gun, and allowed to dry.

In order to determine the weight of the coating applied to the blocks, a weighed glass slide was placed adjacent to the surface of each block, and the slides were coated in the same operation as the surface of the blocks. After the coating was dried the slides were weighed again to determine the weight of the coating on the slides, and therefore on the adjacent blocks. This determination showed that one block contained a coating weight of 0.13 ounces per foot$^2$ and the other a coating weight of 0.24 ounces per foot$^2$.

Each block was placed in a separate plastic glove bag along with a new tooth brush. By plastic glove bag is meant a large polyethylene bag (capacity between about 50 and 60 gallons) having a sleeve which is integral with the wall and extending inward and ending in a glove. Two air filter cassettes of about two inches diameter were also placed in the bag. Each carried a polycarbonate filter with a pore size of 0.4 microns. One, through which air was evacuated, was placed near the test block and connected to tubing which passed through the side of the bag to a vacuum connection. The other, through which air entered, was placed inside and near the top of the bag and connected to tubing passing through the side of the bag to the atmosphere. The top of the bag and the air inlet and exit tubes were sealed so that air could enter and leave the bag only through the tubes. The asbestos released from the sample may be captured on the filter by pumping air through the glove bag during and subsequent to the release of asbestos fibers.

The surface of each block was brushed manually for two minutes, while air was evacuated from (and entered) the bag at a rate of 10 liters per minute. Air was passed through the bag for an additional 10 minutes to ensure that the asbestos fibers suspended in the air would be trapped on the exit filter. The polycarbonate filter was then removed from the exit filler cassette and prepared for transmission electron microscope analysis of asbestos content. This was done using the standard National Institute of Safety and Health procedure 77-204-NIOSH "Technical Evaluation of Fibrous Particle Fibers". A film of carbon was deposited on the surface of the polycarbonate filter by vacuum evaporation of carbon using a Denton Vacuum Unit Model DV502. Then the polycarbonate filter was removed by reflux distillation in chloroform, leaving a carbon film containing the asbestos fibers. The resulting film is suitable for analysis for fiber content by conventional transmission electron microscopy. The results of the analysis are shown in the following table.

TABLE 1

|  | A (Control) | B | Reduction Over Control* | BLOCK Reduction As a % of Control* | C | Reduction Over Control* | Reduction As a % of Control* |
| --- | --- | --- | --- | --- | --- | --- | --- |
| Polymer Coating wt. (oz/sq ft.) | 0 | 0.13 | | | 0.24 | | |
| No. of Asbestos Fibers | $1.6 \times 10^6$ | $3.7 \times 10^4$ | $1.23 \times 10^6$ | greater than 95% | not detectable | $1.16 \times 10^6$ | greater than 95% |
| Wt. of Asbestos Fibers (Nanograms) | $2.47 \times 10^3$ | $9 \times 10^{-2}$ | $2.46 \times 10^3$ | greater than 95% | not detectable | $2.47 \times 10^3$ | greater than 95% |

*Assuming substantially equivalent coating of asbestos fiber and brushing which would release asbestos fibers of equivalent orders of magnitude.

The above procedure was repeated on a substrate of brown coat (perlited gypsum). The Samples were tested without a coating and with a coating of 0.24 oz./ft². The results are:

TABLE 2

|  | BLOCK A | B |
| --- | --- | --- |
| Polymer coating (oz/sq ft.) | 0 | 0.24 |
| No. of Fibers | $4.9 \times 10^5$ | 0 |
| Wt. of Fibers (Nanograms) | $2.5 \times 10^4$ | 0 |

The data in the table shows that by coating the asbestos film with a polymer film having a weight of 0.13 oz./sq.ft., the number of fibers removed by brushing was greatly reduced, and with a film having a weight of 0.24 oz./sq.ft. no fibers were detectable in the atmosphere.

EXAMPLE 2

The embodiment of the present invention to remove airborne hazardous material from an environment is illustrated in the following example.

Three sealable particle board boxes 36"×36"×36" were used in this experiment. The boxes had a glass tube through the top through which asbestos fibers could be introduced. The atmosphere in the boxes could be evacuated through tubes and filters as described in Example 1. Thus, airborne particulate material in the box could be collected and measured on the filter system as described in Example 1.

Two of the wooden boxes were not treated. One box had its interior lined with plastic sheet coated with about 0.24 oz/ft² of the latex used in Example 1. The coating procedure for the plastic sheet was as described in Example 1. Into each box was placed a fan. The circulation rate was comparable to the flow rate obtained by an industrial 24" fan in a room about 20'×20'×20'. This gave an air velocity of about 500 ft/min.

A 71.5 mg. sample of a mixture of sand:asbestos 3:1 was injected into the treated box. A 75.0 mg. sample of the same mixture was injected into the box lined with the coated plastic. No sample was injected into the second untreated box which provided a background reference. The fan was operated for 3.6 hours, then the atmosphere in each box was filtered for one hour as described in Example 1. The airborne concentration of asbestos fibers in the boxes was then calculated. The results are presented in Table 3.

TABLE 3

|  | Control | Unlined | Lined |
| --- | --- | --- | --- |
| Coat weight | Nil | Nil | 0.24 oz/ft² |
| Asbestos introduced | Nil | 23.5 mg | 25 mg |
| Residual Asbestos |  |  |  |
| Fiber weight (nanograms/ft²) | Nil | $6.4 \times 10^4$ | 452 |
| fiber/cc | Nil | 0.96 | 0.14 |
| % Reduction: |  |  |  |
| Fiber weight nanograms | — | — | greater than 95% |
| Fiber per cc | — | — | about 85% |
| Fiber Size Distribution |  |  |  |
| smaller than 5 μm | — | 37 | 63 |
| larger than 5 μm | — | 84 | 16 |

It should be noted that the airborne asbestos was significantly reduced but not completely eliminated. From a study of fiber distribution it appears that the larger fibers are more rapidly removed from the airborne particles.

Having described the invention in detail and exemplified the manner in which it may be carried out, it will be readily apparent to those skilled in the art that numerous variations, for example in types of polymers, can be made without departing from the spirit and scope of the invention.

What is claimed is:

1. A process for reducing the health hazzard from residual hazardous particulate material following the bulk removal of said material from a substrate which comprises applying to the substrate, adjacent surfaces, or both an unfilled coating composition which does not contain any water soluble alkali metal silicate, which has on drying a tack of at least 300 g when determined by the Polyken Probe Tack Test according to ASTM D-2979 on a sample having a thickness of 0.003 inches said compound being applied at a rate to provide a dry coat weight of at least 0.1 oz. per square foot and consisting essentially of a latex and tackifier in a dry weight ratio from 100:0 to 100:40 wherein said latex is an aqueous polymeric dispersion containing at least 35 weight percent of a solid synthetic random polymer having a Tg from −40° to 10° C. consisting essentially of:
   (i) from 60 to 75 weight percent of butadiene or isoprene;
   (ii) from 20 to 40 weight percent of styrene;
   (iii) from 0.5 to 5 weight percent of a $C_{3-6}$ ethylenically unsaturated carboxylic acid; and
   (iv) from 0.5 to 5 weight percent of an amide of a $C_{3-6}$ ethylenically unsaturated carboxylic acid, said amide being unsubstituted or substituted at the nitrogen atom by a $C_{1-4}$ alkyl or alkanol radical;

said polymer having a molecular weight distribution such that from 20 to 75 weight percent of the polymer has a moelcular weight greater than 320,000;
and said tackifier is selected from the group consisting of rosin, hydrogenated rosin, mono, di and tri ethylene glycol esters of rosin, and synthetic tackifiers manufactured from a cut of a $C_9$ aromatic hydrocarbon stream or a cut from a $C_5$ aliphatic or cycloaliphatic hydrocarbon stream.

2. A process according to claim 1 wherein the composition is characterized by having on drying a tack of from about 450 to about 1000 g when determined by the Polyken Pobe Tack Test according to ASTM D-2979 on a sample having a thickness of 0.003 inches.

3. A process according to claim 2 wherein said composition in an aqueous emulsion or dispersion, which is only applied to said adjacent surfaces which comprise removable surfaces of continuous sheet or web material selected from the group consisting of polyethylene, polypropylene, polyamide, polyester and polyolefin terephthalate resins.

4. A process according to claim 2 wherein the polymer has a molecular weight distribution so that from about 20 to 45 weight percent of the polymer has a molecular weight of from 3,500 to 32,000.

5. A process according to claim 10 wherein the composition is characterized by having on drying a tack of from about 450 to about 1000 g/cm$^2$ when determined by the Polyken Probe Tack Test according to ASTM D-2979 on a sample having a thickness of 0.003 inches.

6. A process according to claim 5 wherein said surface comprises a sheet, web or tube of a material selected from the group consisting of paper, polyethylene, polypropylene, polyamide, polyester and a polyolefin terephthalatte resins.

7. A process according to claim 1 wherein said sheet web or tube is suspended in said environment and acts as a baffle over which the environment is circulated.

8. A process according to claim 7 further including removing said sheet web or tube from said environment after it is loaded with said particulate hazardous material.

9. In the physical removal from a substrate by scraping or brushing of a hazardous material which is prone to release airborne particles the improvement comprising impregnating the material with a composition consisting essentially of;
an emulsion, solution, dispersion, or liquid polymer comprising at least 35 weight percent of one or more natural or synthetic polymers having a Tg from −40° to 10° C. or natural or synthetic resins selected from the group consisting of:
(i) co- or homo-polymers of one or more $C_{4-6}$ conjugated diolefins which may be unsubstituted or substituted by a $C_{1-4}$ alkyl radical or a chlorine atom;
(ii) copolymers comprising from about 0.5 up to about 40 weight percent of a $C_{2-4}$ olefin and from about 60 to about 99.5 weight percent of one or more esters selected from the group consisting of $C_{2-8}$ alkenyl or alkenol esters of $C_{1-8}$ saturated acids,
(iii) random or block copolymers comprising from about 85 to about 40 weight percent of one or more $C_{4-6}$ conjugated diolefins and from about 15 to 60 eight percent of one or more $C_{8-12}$ vinyl aromatic monomers which may may contain a nitrogen atom in the aromatic ring, and which may be unsubstituted or substituted by a $C_{1-4}$ alkyl radical or a chlorine or bromine atom, and
(iv) polymers comprising from about 5 to 20 weight percent of vinyl pyridine, from about 5 to 20 weight percent styrene and the balance butadiene;
(v) co- or homo-polymers of one of more monomers selected from the group consisting of $C_{2-8}$ alkenyl or hydroxy alkenyl esters of $C_{1-6}$ saturated acids;
(vi) copolymers comprising from about 0.5 to 25 weight percent of a $C_{1-8}$ alkyl or alkanol ester of a $C_{3-6}$ ethylenically unsaturated carboxylic acid and from about 99.5 to about 75 weight percent of a $C_{2-8}$ alkenyl or alkenol ester of a $C_{1-8}$ saturated carboxylic acid;
(vii) natural rubber latex;
(viii) rosin, $C_{1-8}$ alkyl; $C_{1-8}$ hydroxyalkyl, and mono, di, or tri ethylene glycol esters of rosin and hydrogenated rosin wherein the $C_{1-8}$ hydroxyl alkyl esters may contain up to four hydroxyl groups and polyterpenes;
(ix) synthetic hydrocarbon tackifier resins manufactured from a cut of a $C_9$ aromatic hydrocarbon stream; or a cut of a $C_5$ aliphatic or cycloaliphatic hydrocarbon stream;
(x) co- or homo-polymers of from 100 to 90 weight percent of a $C_4$ straight chained or branched aliphatic monomer contains a single ethylenic unsaturated bond and from 0 to 10 weight percent of a $C_{4-6}$ conjugated diolefin; which polymer may contain up to about 5 weight percent of a halogen atom selected from the group consisting of chlorine and bromine atoms;
(xi) polyvinyl pyrrolidone; and
(xii) natural gums
from 0 to 5 weight percent of a surfactant where required an effective amount of one or more members selected from the group consisting of surfactants, thickeners, fillers, plasticizers and extending oils, and sufficient dilutant to bring the composition to 100 weight percent said composition having on drying a tack of at least 300 g when determined by the Polyken Probe Tack Test according to ASTM D-2979 on a sample having a thickness of 0.003 inches and being applied to provide at least about 0.1 oz. per square foot of said polymer.

10. A process for reducing the airborne concentration of particulate hazardous material to an area at least partially enclosed with flexible plastic sheet material which comprises applying to not less than one sixth of the surface of said flexible plastic sheet material an unfilled coating composition which does not contain any water soluble alkali metal silicate, which has on drying a tack of at least 300 g when determined by the Polyken Probe Tack Test according to ASTM D-2979 on a sample having a thickness of 0.003 inches said compound being applied at a rate to provide a dry coat weight of at least 0.1 oz. per square foot and consisting essentially of a latex and a tackifier in a dry weight ratio from 100:0 to 100:40 wherein said latex is an aqueous polymeric dispersion containing at least 35 weight percent of a solid synthetic random polymer having a Tg from −40° to 10° C. consisting essentially of:
(i) from 60 to 75 weight percent of butadiene or isoprene;
(ii) from 20 to 40 weight percent of styrene;
(iii) from 0.5 to 5 weight percent of a $C_{3-6}$ ethylenically unsaturated carboxylic acid; and (iv) from 0.5 to 5 weight percent of an amide of a $C_{3-6}$ ethylenically unsaturated carboxylic acid, said amide being unsubstituted or substituted at the nitrogen atom by a $C_{1-4}$ alkyl or alkanol radical;

said polymer having a molecular weight distribution such that from 20 to 75 weight percent of the polymer has a molecular weight greater than 320,000;

and said tackifier is selected from the group consisting of rosin, hydrogenated rosin, mono, di and tri ethylene glycol esters of rosin, and synthetic tackifiers manufactured from a cut of a $C_9$ aromatic hydrocarbon stream or a cut from a $C_5$ aliphatic or cycloaliphatic hydrocarbon stream and circulating the atmosphere in said environment at a rate so that it will pass over said composition not less than once per hour.

11. In the physical removal from a substrate by scraping or brushing of a hazardous material which is prone to release airborne particles, the improvement comprising impregnating the material with an unfilled composition which does not contain any water soluble alkali metal silicate, which has on drying a tack of at least 300 g when determined by the Polyken Probe Tack Test according to ASTM D-2979 on a sample having a thickness of 0.003 inches consisting essentially of a latex and a tackifier in a dry weight ratio from 100:0 to 100:40 wherein said latex is an aqueous polymeric dispersion containing at least 35 weight percent of a solid synthetic random polymer having a Tg from −40° to 10° C. consisting essentially of:

(i) from 60 to 75 weight percent of butadiene or isoprene;

(ii) from 20 to 40 weight percent of styrene;

(iii) from 0.5 to 5 weight percent of a $C_{3-6}$ ethylenically unsaturated carboxylic acid; and (iv) from 0.5 to 5 weight percent of an amide of a $C_{3-6}$ ethylenically unssasturated carboxylic acid, said amide being unsubstituted or substituted at the nitrogen atom by a $C_{1-4}$ alkyl or alkanol radical;

said polymer having a molecular weight distribution such that from 20 to 75 weight percent to of the polymer has a molecular weight greater than 320,000;

and said tackifier is selected from the group consisting of rosin, hydrogenated rosin, mono, di and tri ethylene glycol esters of rosin, and synthetic tackifiers manufactured from a cut of a $C_9$ aromatic hydrocarbon stream or a cut from a $C_5$ aliphatic or cycloaliphatic hydrocarbon stream.

* * * * *